United States Patent [19]

Hardeng

[11] Patent Number: 5,119,244

[45] Date of Patent: Jun. 2, 1992

[54] METHOD AND APPARATUS FOR RECORDING DATA INFORMATION ON A MAGNETIC RECORDING MEDIUM

[75] Inventor: Erik Hardeng, Oslo, Norway

[73] Assignee: Tandberg Data AS, Norway

[21] Appl. No.: 508,244

[22] Filed: Apr. 11, 1990

[30] Foreign Application Priority Data

Apr. 12, 1989 [EP] European Pat. Off. ............ 89106522

[51] Int. Cl.$^5$ ................................................ G11B 5/09
[52] U.S. Cl. ......................................... 360/46; 360/45
[58] Field of Search ............................ 360/46, 31, 45

[56] References Cited

U.S. PATENT DOCUMENTS

| | | | |
|---|---|---|---|
| 3,564,160 | 2/1971 | Tenes | 360/46 |
| 4,202,017 | 5/1980 | Geffon et al. | 360/45 |
| 4,412,257 | 10/1983 | Lesieur | 360/45 |
| 4,420,776 | 12/1983 | Jove et al. | 360/45 |
| 4,547,818 | 10/1985 | Lia | 360/46 |
| 4,809,088 | 2/1989 | Lofgren et al. | 360/45 |

FOREIGN PATENT DOCUMENTS

| | | |
|---|---|---|
| 0030644 | 6/1981 | European Pat. Off. . |
| 57-12406 | 1/1982 | Japan . |
| 58-199410 | 11/1983 | Japan . |
| 0199410 | 11/1983 | Japan . |
| 2072926 | 10/1981 | United Kingdom ............... 360/31 |
| 2102616 | 2/1983 | United Kingdom . |
| 2179487 | 3/1987 | United Kingdom . |

OTHER PUBLICATIONS

Hahs, W. R., "Bit Displacement Compensation for High-Density Recording", IBM Technical Disclosure Bulletin, vol. 14, No. 11, Apr. 1972.

Primary Examiner—David J. Severin
Attorney, Agent, or Firm—Hill, Van Santen, Steadman & Simpson

[57] ABSTRACT

A method and an apparatus for recording data information on a magnetic recording medium with the assistance of a magnetic write head and a controllable record amplifier preceding the magnetic write head and to which the data information in the form of binary data signals, as well as bias signals superimposed thereon are supplied, are disclosed. The recorded signals are, in turn, read with a playback device immediately after the recording. In a measuring device, the peak shift of the read output signals is measured and averaged. The amplitudes for the binary data signals and/or of the bias signals are corrected with a control signal generated by a control unit dependent on the average peak shift, being corrected in order to achieve an optimum relationship of read output signal amplitude to minimum peak shift.

13 Claims, 3 Drawing Sheets

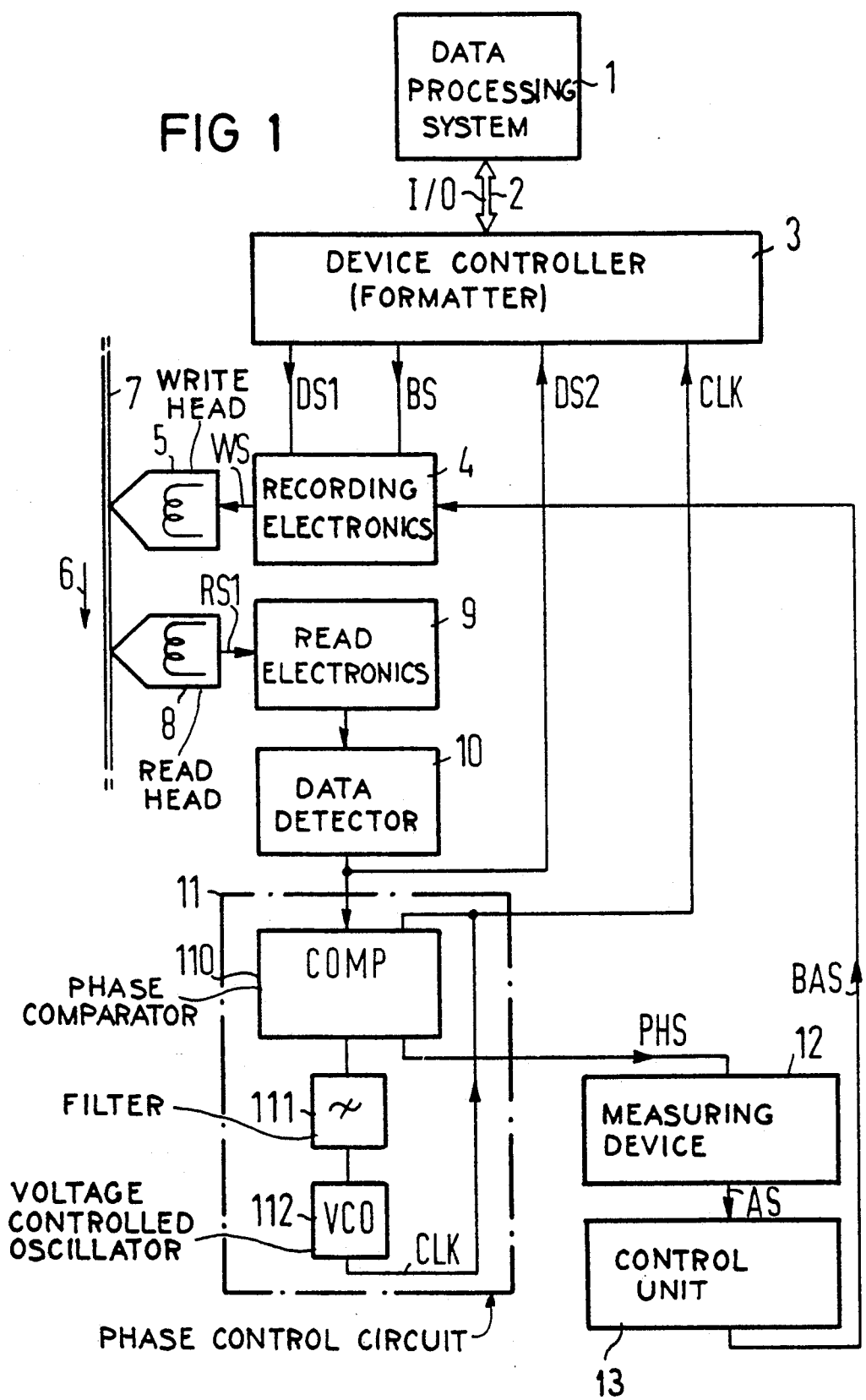

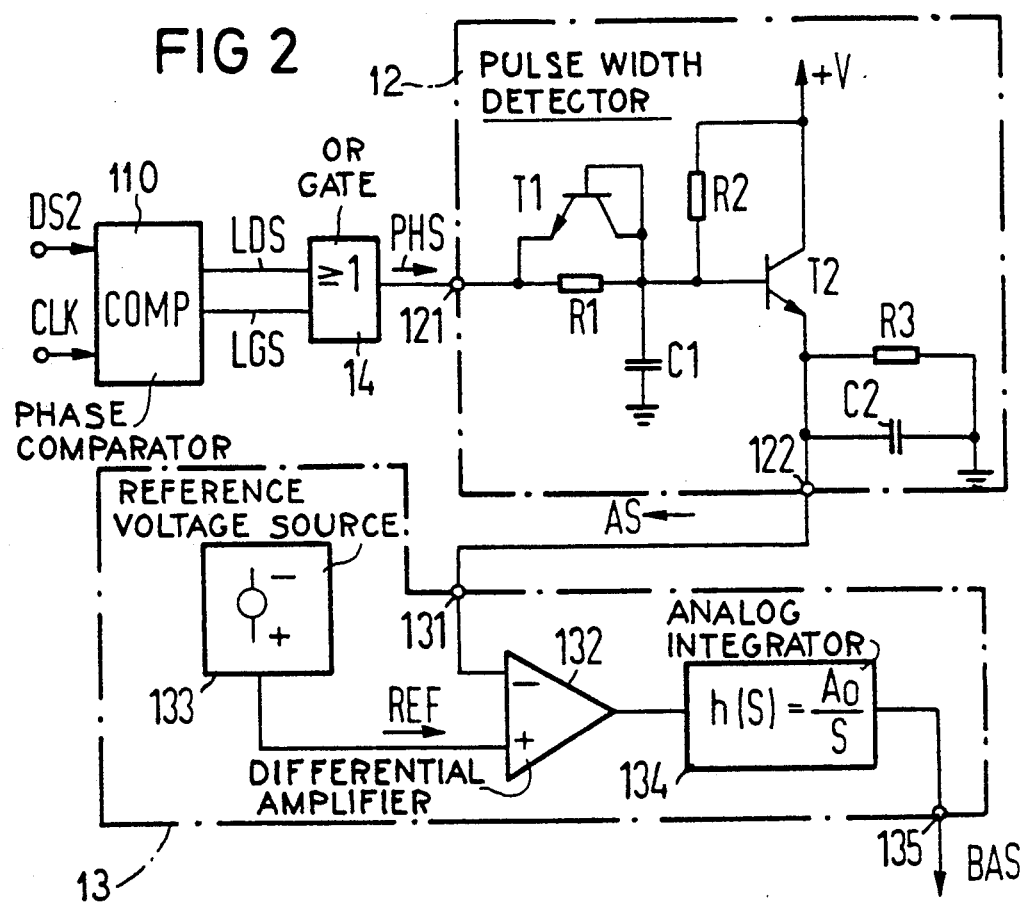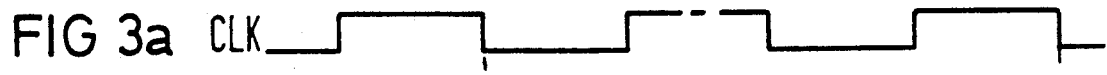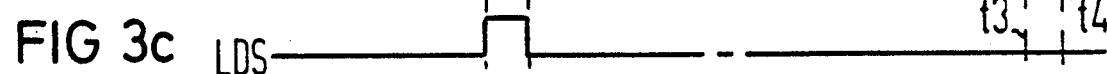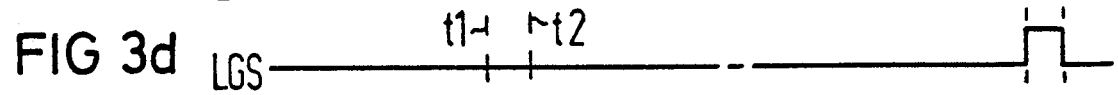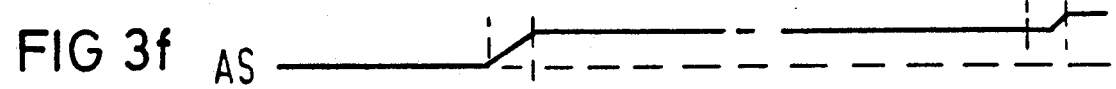

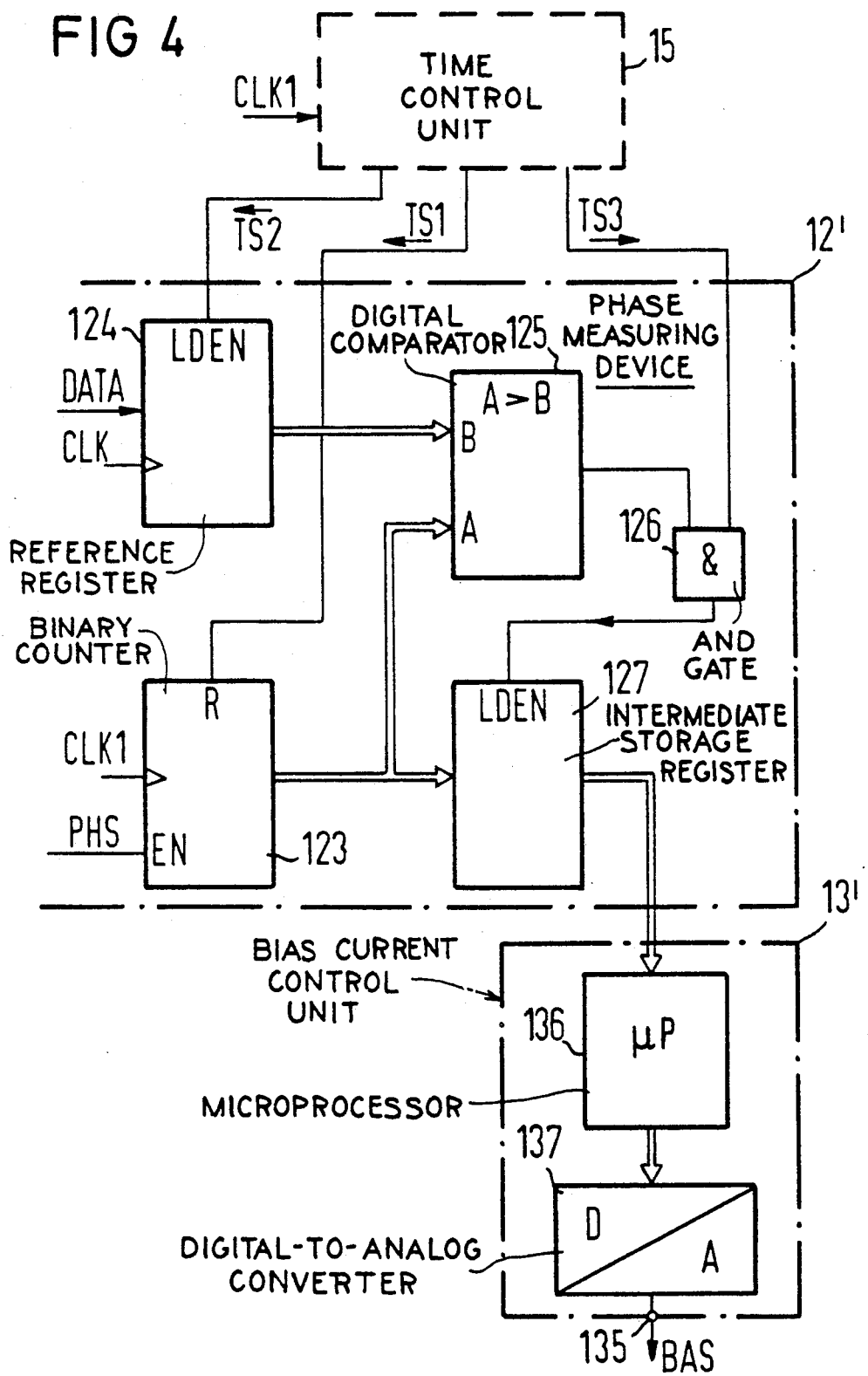

METHOD AND APPARATUS FOR RECORDING DATA INFORMATION ON A MAGNETIC RECORDING MEDIUM

BACKGROUND OF THE INVENTION

1. Field of the Invention

The present invention is directed to a method for recording data information on a magnetic recording medium with the assistance of a magnetic write head and of a controllable recording amplifier connected to drive the write head by supplying the data information thereto in the form of binary data signals as well as bias signals superimposed thereon, and to apparatus for implementing the method.

2. Description of the Prior Art

In recording data information on a magnetic recording medium, for example, a magnetic tape or a magnetic disk, it is already well known in the art to supply the data information to be recorded serially to a recording amplifier in the form of binary data signals. This recording amplifier generates a recording current for a magnetic write head, the current being proportional to the data signals. A number of recording methods, for example NRZ, MFM and GCR recording methods, are available for the representation of the data information in the form of binary data signals.

When the recording current, as indicated, is directly proportional to the data signals, then the operation is generally referred to as direct data recording. In magnetic recordings of analog signals, for example, in audio technology, however, it is frequently preferred to superimpose preferably higher frequency bias signals on the analog signal that represents the useful information. The influence of the bias on the actual recording event is complex and can only be presented by way of models. What is merely to be indicated here is that the remanent magnetization on the magnetic recording medium should be optimally high and should thereby be linearly proportional to the recording field strength. As known, however, standard magnetic recording media generally have a highly non-linear magnetization characteristic. However, a portion of the magnetic field is produced with the assistance of the bias signals, one therewith succeeding in linearizing the recording event in view of the magnetic field portion that corresponds to the information signal. With an unidentifiable bias portion, in combination with a magnetic field portion corresponding to the information signal, one therefore succeeds in eliciting a magnetization value that is proportional to the information signal.

Of course, such a linearization of the magnetic recording event when recording analog information signals is of particular significance since the reproduction quality is directly dependent thereon. The requirement for high linearity is initially less critical in the magnetic recording of data information in the form of binary data signals since the overall information is stored in such cases in the form of discrete magnetization conditions or, more precisely, in the form of magnetization flux changes. For this reason, data information is currently still frequently magnetically recorded with a direct recording method.

The magnetic recording of data information with the assistance of a high-frequency pre-magnetization, however, also has advantages in digital data recording, particularly when high recording densities are desired as presented, for example, in the U.S. Pat. No. 4,202,017, fully incorporated herein by this reference. In accordance therewith, disturbances also occur in digital data recording having high recording densities, particularly during the read-out event, these disturbances to be attributed to the influence of flux changes adjacent to one another. This is expressed as a peak shift with corresponding distortion of the read output signals, whereby the amplitude of the read output signals can also be great. According to the known technical teaching, this effect can be reduced in that an alternating current is superimposed on the recording current that corresponds to the data signals to be recorded, being superimposed thereon for bias. The amplitude of the alternating current is selected such that the magnetization field strength in the recording medium is approximately equal to its coercivity. When the amplitude for the data signal changes is then selected such that it essentially corresponds to that of the bias signals, then the sum of the two signal amplitudes produces a recording in the saturation region.

The European application 0 030 644, for example, discloses a similar technique. In the magnetic storage device for digital recording disclosed therein, high-frequency bias signals are superimposed on the data signals in a synchronized manner. As a consequence of this bias, the amplitude of the data signals to be recorded can be reduced, so that a cross talk from recording magnetic heads to reading magnetic heads can be prevented during the recording event. Furthermore, the recording event is linearized, due to this bias, so that the changes of the data signal read out correspond to the changes of the magnetization on the recording medium can be more accurately recognized.

The situation, however, is such that the effect of the peak shift in a given recording density is dependent not only on the amplitude of the data signals to be recorded, i.e. on the data recording current in such fashion that the peak shift arises with increasing signal amplitudes. The effect of peak shift, on the contrary, is also dependent on the coercivity of the recording medium. Given this influencing variable, the peak shift becomes all the lower, the higher the coercivity of the recording medium. The coercivity of the magnetic recording media, magnetic tapes of different manufacturers, for example, however, is not uniform and is not even necessarily completely uniform over the entire length of a magnetic tape. Added thereto is that the coercivity of a magnetic recording medium is dependent on temperature, i.e. decreases with increasing temperature.

As indicated above, each definition of the amplitude of bias signals with reference to the data signals to be recorded strives for a compromise that yields an optimally-low peak shift of the read output signals given an optimally-high recording signal amplitude. When the relationship between bias current and data recording current has been fixed in this manner in a storage device, then it is unavoidable that the optimum value for a minimum peak shift is normally rarely achieved, since the manufacturer of the storage device has no influence on the temperature at which recording with this device is undertaken on recording media having different coercivities.

SUMMARY OF THE INVENTION

In a method of the general type initially set forth, as well as in a device for the implementation of the method, it is therefore an object of the invention to create the conditions for minimizing the influence of changing coercivity of the magnetic recording medium.

In a method of the type initially mentioned, the above object is achieved, according to the present invention, in a method for recording data information on a magnetic recording medium with the assistance of a magnetic write head and a controllable recording amplifier connected to drive the write head by supplying the data information thereto in the form of binary data signals as well as bias signals superimposed thereon, the method being particularly characterized in that the recorded signals are again read immediately after recording, in that the peak shift of the read output signals acquired in this manner is measured, and in that the amplitudes of the binary data signals and/or of the bias signals are corrected dependent on the measured peak shift in order to achieve an optimum relationship between read output signal amplitude and minimum peak shift.

The present invention is thereby based on the perception that the desired, low peak shift cannot be achieved with a rigidly-prescribed relationship between data recording current and bias current and resolves this problem in that this relationship is corrected dependent on the current values of the influencing variables. To this end, data are first recorded with a prescribed relationship of data recording current and bias current. Subsequently, the recorded data are immediately subjected to the read-after-write check, so that the peak shift of the read output signals can be identified. Dependent on the identified peak shift, the data recording current and/or the bias current is then corrected in the direction that reduces the peak shift of the read output signals. In other words, a control loop is employed for setting the bias current, the control loop being designed such that a prescribed minimum value for the peak shift is largely approximately continuously maintained insofar as possible. What continuously means here, however, is preferably that the relatively slow temperature response is leveled. The control loop is relatively slow in implementation and should not respond to momentary shifts of the peak values, i.e. briefduration phase jitter.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of a magnetic tape recorder device for recording and playing back data information and that comprises a control loop for the continuous correction of a bias current in accordance with the present invention;

FIG. 2 is a schematic circuit diagram of a critical unit of the control loop constructed in analog technology;

FIG. 3 is a graphic illustration in the form of a series of pulse diagrams individually labeled FIG. 3a, FIG. 3b, FIG. 3c, FIG. 3d, FIG. 3e and FIG. 3f for explaining the operation of the circuit diagram of FIG. 2; and FIG. 4 is a block circuit diagram showing another embodiment of the critical units of the control loop for setting the bias current in digital circuit technology.

DESCRIPTION OF THE PREFERRED EMBODIMENTS

Referring to FIG. 1, a block circuit diagram of a magnetic tape recorder is illustrated for recording and playing back data information and schematically shows a data processing system 1 that exchanges data information with a device controller (formatter) 3 via a data bus 2. The formatter 3, as is known, serves the purpose of adapting the data transmission via the data bus 2 to the bit-serial data transport within the magnetic tape recorder device that is controlled by an internal clock CLK.

Signals occurring at the internal interface of the formatter 3 are thereby recited here only insofar as this is of interest for the present case. The formatter 3 supplies record signals DS1 that represent the bindary coded data information to a recording electronics 4 also including a controllable recording amplifier. The formatter 3 also transmits high-frequency bias signals BS that are superimposed on the recording signals DS1 in a synchronized manner in the recording electronics 4 in order to generate superimposed write signals WS that are supplied to a magnetic head referenced as a write head 5. Due to the superimposed write signals WS supplied to the magnetic head 5, a recording current is produced in the magnetic coil thereof that, in turn, produces corresponding magnetization conditions that represent the recorded data information in a magnetic tape 7 running past the magnetic head 5 in a running direction referenced by an arrow 6.

As shall be set forth below in greater detail, the recording current is composed of a weaker current component produced by the record signals DSI as well as of a current component stronger in comparison thereto that is to be attributed to the high-frequency bias signals BS. The ratio of these current components is thereby selected such that the magnetization conditions occurring on the magnetic tape 7 during the recording event have as little mutual influence on one another as possible, i.e. such that an optimally-low degradation occurs. In other words, this, in turn, means for the read-out event that the read-out signals read from the magnetic tape 7, given a high signal-to-noise ratio, have an optimally-low peak shift in comparison to the pulse sequence of the original record signals DS1.

A further magnetic head, the read head 8, in which analog read output signals RS1 corresponding to the sensed magnetization conditions on the magnetic tape 7 are induced is provided for reading the recorded information from the magnetic tape 7. These read output signals RS1 are edited in a read electronics 9 of conventional design. A data detector 10 that reshapes the analog read output signals RS1 edited in the read electronics into pulse-shaped data read signals DS2 is connected to the read electronics 9.

These data read signals DS2 are supplied to the formatter 3 as bit-serial data information and are converted in the formatter 3 into a format in which they can be transmitted to the data processing system 1 via the data bus 2 as output data.

Further, the data read signals DS2 are supplied to a phase control circuit 11 for recovering the data clock. The phase control circuit 11 includes a phase comparator 110 as an input circuit. A loop filter 111 as well as a voltage-controlled oscillator 112 are connected thereto. The oscillator supplies the internal clock signal CLK that is supplied in parallel both to the formatter 3 and to the phase comparator 110 as an input signal. The phase comparator 110 compares the two signals supplied thereto and, given a phase offset of the two signal pulse sequences, outputs an appropriate control signal to the voltage-controlled oscillator 112 via the loop filter 111, the control signal correcting the phase and, potentially, the frequency thereof in order to match the internal clock signals CLK to the momentary phase of the data read signals DS2.

As set forth up to now, the embodiment of a magnetic tape recorder for recording and playing back digital data information, as shown in FIG. 1, corresponds to completely conventional solutions, so that a detailed description of the magnetic tape recorder proceeding beyond this circuit diagram of FIG. 1 does not appear to be necessary here. The above description has been presented in this form only so that the overall relationship of the present invention is clearly expressed and it is also shown to what extent a conventional structure can be employed for the magnetic tape recorder in order to execute the desired functions.

In addition, the signals output by the phase comparator 110 are now supplied to a measuring device 12 in the form of phase pulses PHS. The pulse durations of the phase pulses PHS thereby correspond to the chronological offset of the data signals DS2 supplied to the phase comparator 110 with reference to the internal clock signals CLK. The measuring device 12 serves the purpose of measuring the pulse duration of the phase pulses PHS, whereby the result of the measurement in the form of a control signal AS is supplied to a control unit 13 for the bias current. Based on the prescription of a relationship yet to be set forth in detail, the control unit 13 derives the control signal BAS from this input quantity for setting the bias current that is supplied to the record electronics 4 and that may potentially effect an adaptation of the gain for the highfrequency bias signals BS.

The following recording method, consequently, is possible with this circuit arrangement set forth with reference to FIG. 1. The record electronics 4 of the magnetic tape recorder is initially supplied with the bit-serial data record signals DS1 and with the high-frequency bias signals BS having prescribed signal amplitudes. With a relationship of the signal amplitudes that is initially prescribed, the data record signals DS1 are superimposed with the high-frequency bias signals BS in a synchronized manner and corresponding magnetization conditions are generated on the magnetic tape 7. The data read signals DS2 are generated from these immediately after recording with a readafter-write check.

Since the recording event and the following read event are controlled by the internal clock sequence CLK, no phase shift should ideally occur between the data record signals DS1 and the data read signals DS2. When the phase comparator 110 nonetheless identifies phase offsets, the same is to be essentially attributed to disturbing influences in the recording event. These peak shifts are measured in the measuring device 12 and the measured values are reshaped in the control unit 13 to form a control signal BAS for correcting the bias current in the record electronics 4. The reshaping can provide a limitation of the control signal, so that the bias current is variable only within a prescribed range.

The record electronics 4, in combination with the write head 5 the read head 8 with the connected read electronics 9, the data detector 10, the phase comparator 110, the measuring device 12 and the control unit 13 thus form a control circuit for controlling the bias current dependent on current parameters, particularly on the coercivity of the magnetic tape 7 as well as on the momentary temperature in the magnetic tape recorder.

One therefore succeeds in producing magnetization conditions on the magnetic tape 7 from which data read signals DS2, whose peak shift is held to a low optimum value, are then reacquired in a later read event, being produced in the recording event independently of the operating temperature or, respectively, of a variation of the coercivity of individual magnetic tapes. The remaining optimum of the momentary peak shift is based on briefduration influences such as, for example, the mutual interference of neighboring magnetization changes, and can therefore not be systematically eliminated in a given recording method.

FIG. 2 illustrates an exemplary embodiment of the phase measuring device 12, as well as of the control unit 13 for the bias current as constructed in accordance with analog circuit technology. In order to produce the relationship with FIG. 1, the phase comparator 110 is again illustrated in FIG. 2, the data read signals DS2, as well as the internal clock signals CLK being supplied thereto as signals to be compared. Conventional phase comparators for the phase control circuits, as considered here, produce output signals that represent the phase difference in terms of magnitude and direction. When the internal clock sequence CLK leads the data read signal sequence DS2, then the phase comparator 110 outputs a leading phase signal LDS (LEAD signal) whose pulse width corresponds to the momentary phase difference between the input signals of the phase comparator 110. In the inverse case, i.e. given a lagging internal clock signal sequence CLK, a lagging phase signal LGS (LAG signal) having a corresponding pulse width is generated. Since this function of the phase comparator 110 lies entirely within a conventional scope, it is merely indicated as a block in FIG. 2.

In contrast to the signal processing in conventional phase control circuits, the direction of the phase deviation between the data read signals DS2 and the internal clock signal sequence CLK plays no part in the present application. For this reason, the two phase signals LDS or, respectively, LGS are operated via an OR gate 14 that therefore only outputs the amount of the phase pulses PHS representing the momentary phase difference. However, phase comparators are also known in which this logical operation is already undertaken in the circuit itself; the OR gate is then superfluous.

The phase pulses PHS are therefore unipolar, pulse-width modulated signals whose pulse width corresponds to the momentary peak shift of the interpreted analog read output signals RS1. This actual value of the momentary phase offset is supplied to the phase measuring device 12 that is constructed as a pulse width detector. An RC-element in the form of a first ohmic resistor R1 and of a first capacitor C1 is arranged between a signal input 121 thereof and ground. A diode, in the form of a diode-coupled first transistor T1 that serves the purpose of being able to quickly discharge the first capacitor C1 is connected in parallel to the first ohmic resistor R1.

The base of a further transistor T2 is connected to the junction between the first resistor R1 and the first capacitor C1. A positive operating voltage +V is supplied to the collector of the second transistor T2 and to its base, via a further resistor R2, the base resistor. A further RC-element is connected to the emitter of the second transistor T2. This further RC-element is composed of a parallel circuit of a further ohmic resistor R3 and a second capacitor C2 and is arranged between the emitter of the second transistor T2 and ground. The emitter of the second transistor T2 is connected to the signal output 122 of the pulse width detector 12.

The described output stage of the pulse width detector is accordingly an emitter follower having a RC-element in the emitter branch whose dimensioning defines the integration function of the pulse width detector 12. The second transistor T2 serves as an inhibiting element in order to avoid an undesired discharge of the second capacitor C2. In and of itself, a diode could also be employed for this purpose; the transistor T2, however, additionally enables an impedance conversion, so that the second capacitor C2 can therefore be dimensioned larger. The time constant of the second RC-element R3, C2 therefore becomes correspondingly high. This is the prerequisite therefore, that the integrator stage of the pulse width detector 12 integrates the supplied phase pulses PHS over a time interval that is extremely long compared to a bit interval. With high approximation, the charge at the second capacitor C2 therefore corresponds to the mean value of the phase differences of the data read signals DS2 whereby all phase distortion to be attributed to different bit combinations of the data information is suppressed. This feature significantly contributes to the stability of the control circuit since it cannot induce itself to oscillations due to brief-duration disturbances. The feature is also admissible in the present application since, of course, fluctuations of the peak shift that are of long duration in comparison to the length of a bit period and that can be attributed, among other things, to temperature influences are to be leveled.

An analog signal AS that corresponds to the momentary charge of the second capacitor C2, i.e. to the mean value of the current phase offset of the data read signals DS2 from the internal clock pulse sequence CLK is therefore output at the signal output 122 of the pulse width detector 12.

FIG. 3 illustrates a series of pulse diagrams that show the operation of the above-described phase measuring device 12. The internal clock pulse sequence CLK and, respectively, data read signals DS2 are shown by way of example in FIG. 3a and FIG. 3b. The leading phase signal LGS is illustrated in FIG. 3c and the lagging phase signal LGS is shown in FIG. 3b, the leading and lagging signals being derived from the signals supplied to the phase comparator 110. In the present example of FIG. 3a-FIG. 3f, a trailing edge of the internal clock sequence CLK appears at a time t1, but the corresponding edge in the sequence of data read signals DS2 appears shifted in phase to a time t2. A pulse having a corresponding pulse width therefore occurs in the leading phase signal LDS of FIGS. 3c. The opposite case is assumed for the time t3 or, respectively, t4. The lagging phase signal LGS shown in FIG. 3d results here from the leading data read signal DS2.

The phase pulses PHS shown in FIG. 3e derive from the OR operation of the phase signals shown in FIG. 3c and, respectively, FIG. 3d. Corresponding to the described integrator function of the pulse width detector 12, the phase signals PHS are converted into the analog signal AS. It is assumed in the present example that the second capacitor C2 is essentially discharged at the time t1, a condition that particularly appears when the magnetic tape recorder is initialized. Due to the phase pulse PHS appearing at the time t1, the capacitor C2 is quickly charged by the time t2. As a consequence of the dimensioning of the output stage of the pulse width detector 12, the amplitude of the analog signal AS decreases only slowly thereafter with a great time delay. When a further phase pulse PHS that appears at the time t3, the first RC element R1, C1 must be first charged to a corresponding value in order to activate the second transistor and, subsequently, charge the second capacitor C2 to a final value again until the time t4 that corresponds to the pulse width of the appertaining phase pulse PHS.

FIG. 2 then shows that the analog signal AS is supplied to a signal input 131 of the control unit 13 for the bias current. This signal input is connected to an inverting input 131 of a differential voltage amplifier 132 whose non-inverting input, on the other hand, is connected to a reference voltage source 133. The reference voltage source 133 is set when the magnetic tape recorder is assembled such that it outputs reference voltage REF having a predetermined amplitude. The differential voltage amplifier 132 amplifies the difference between the two signals supplied thereto and outputs a corresponding output signal.

The sensitivity of the control circuit for the bias current is therefore set to a defined minimum value of the mean phase offset of the data read signals. This means that the control loop is not influenced at all by phase offsets of the data read signals DS2 below a prescribed threshold value, the influence of what is referred to as "phase jitter" on the control loop being therefore avoided.

The output signal of the differential voltage amplifier 132 is supplied to an analog integrator 134. The DC voltage gain $A_o$ thereof is dimensioned such that the analog control signal BAS for setting the bias current occurs with a correspondingly amplified amplitude given the recited transfer function $$h(S) = A_0 : S.$$

where S denotes the frequency.

In a further exemplary embodiment, as shown in FIG. 4, an embodiment of the phase measuring device 12 and of the control unit 13 in accordance with digital circuit technology is shown. As is known, the individual procedures in magnetic storage devices for the signal editing of the serial data information are sequenced in a prescribed time grid that is defined by what is referred to as the bit cell that is, in turn, defined by a predetermined plurality of periods of a high-frequency, internal clock signal sequence CLKI whose frequency is a whole multiple of the frequency of the internal clock signal sequence CLK. In conventional magnetic layer storage devices, the control operations in this time grid are defined by time control signals TS generated by a time control unit 15. One skilled in the art is familiar with time control units of this type and these per se are not part of the present invention. It should merely be summarily indicated here that the time control unit 15 usually has a binary counter that is triggered by the high-frequency internal clock signal sequence CLK1. The time control signals TS are derived from the momentary counter reading of this binary counter. FIG. 4 shows only three time control signals TS1-TS3 whose functions shall be set forth below.

The phase measuring device 12' shown in FIG. 4 comprises a binary counter 123 as a pulse width detector that is triggered by the high-frequency internal clock pulse sequence CLK1. One possible implementation is comprised in conducting the phase pulses PHS to the binary counter 123 as enable signals for the counting mode. The binary counter 123 then counts up in the clock of the high-frequency internal clock pulse sequence CLK1 as long as the high level of the phase pulse is applied. A possible counting inaccuracy that is based on the pulse frequency of the high-frequency internal clock pulse sequence CLKI plays only a subordinate part in the present case since the controlled variable for the control loop is here derived from the main values of the phase offsets. What is critical, however, is that the binary counter 123 assumes a defined initial condition at the beginning of each bit cell. This initial condition is set via a first time control signal TS!. For example, the time control signal should be output by the time control unit 15 at the end of a bit cell and should be supplied to the binary counter 123 as a reset signal. It is therefore assured that the binary counter 123 is set to a counter reading at the end of each bit cell that corresponds to the pulse width of the phase pulse PHS that appeared in this bit cell.

The phase measuring device 12' also has a reference register 124. During running operation of the magnetic layer storage device, a value that operationally corresponds to the reference voltage REF in the above-described exemplary embodiment is digitally stored in this register. This means that the memory content of the reference register 124 defines a prescribed minimum value for the phase offset. The reference register 124 could be constructed as a read-only memory or, on the other hand, as a loadable register, as assumed here. Upon initialization of the magnetic layer storage device, however, this reference value must then be respectively newly loaded.

This is indicated in FIG. 4 in that the loading condition of the reference register 124 is set via a further time control signal TS2 so that it accepts serially-supplied data controlled by the internal clock pulse sequence CLK. For example, this data word can be supplied to the reference register 124 from the formatter 3; however, it would likewise be conceivable to store the corresponding data word in a prefix or header of the magnetic tape 7 and to then supply it to the reference register 124 in the form of data read signals via the read electronics 9 and the data detector 10.

A digital comparator 125 whose first inputs A are connected in parallel to outputs of the binary counter 123 and whose second inputs B are connected to outputs of the reference register 124 is provided as a threshold circuit for the interpretation of the phase pulses PHS.

As soon as the counter reading of the binary counter 123 exceeds the stored value of the reference register 124, the digital comparator 125 outputs an output signal to an AND gate 126. A further time control signal TS3 set for appear shortly before the first time control signal TS1 becomes valid is supplied to a second input of the AND gate 126. The third time control signal TS3 therefore lies at a high level at a time at which the binary counter 123 has reliably completely reacquired the phase pulse PHS appearing approximately in the middle of a bit cell, but at which the binary counter 123 has not yet been reset.

When the AND condition for the AND gate 126 has been met, it outputs an enable pulse to an intermediate memory register 127 whose inputs are connected in parallel to the outputs of the binary counter 123. The intermediate storage register 127 is therefore always loaded with the value of the counter reading of the binary counter 123 shortly before the end of the bit cell in case this value exceeds the predetermined threshold for a phase offset. The intermediate storage register 127 forms the output stage of the phase measuring device 12' that is connected via multiple lines to the control unit 13' for the bias current.

As schematically indicated in FIG. 4, the control unit 13' contains a microprocessor 136 as its core component, this essentially serving the purpose in the present exemplary embodiment of averaging the momentary phase offsets of the data read signals DS2, presented in the form of the respective memory content of the intermediate storage register 127, over a plurality of bit cells. This occurs in the form of a digitallyexecuted integration, for example, upon utilization of a relationship $$Y(n) = Y(n-1) + X(n). \qquad (1)$$

where Y (n) is thereby the integration value at the time of an $n^{th}$ bit cell, Y (n−1) is the corresponding integration value in the preceding bit cell and X (n) is a digital value that corresponds to the momentary phase offset, i.e. to the content of the intermediate storage register 127. In the present application, n is an arbitrary, positive whole number. Such integrations that are based on continuous addition are familiar to those skilled in the art and therefore require no further explanation here.

In addition to this integration, it can be advantageous to allow the microprocessor 136 to computationally execute an amplification of the measured values. As is well known, this can be achieved on the basis of a relationship $$Z(n) = K \times y(n). \qquad (2)$$

where K is a constant, prescribed gain and Z (n) is the amplified momentary value for the averaged phase offset in digital form.

Microprocessors can be relatively easily programmed and are therefore extremely flexible. The described arithmetic operations for the integration in accordance with the relationship (1) an amplification in accordance with the relationship (2) of the integration value are therefore only possible embodiments that, however, do satisfy their purposes. It would be definitely possible within the framework of the present invention to limit the integration time interval and to therefore execute an interpretation of the momentary phase offset only from time-to-time as a diagnosis procedure during on-going operation. In addition to an integration and amplification, it would thereby also be conceivable to employ further routines that, for example, take momentary phase distortions of the read-out data signals DS2 on the basis of the existing bit combination and of the recording method into consideration. Such additional procedures, however, shall not be discussed in the presentation which has been simplified for reasons of clarity, since these additional procedures are not absolutely required without deteriorating the fundamental operation.

The amplified mean value for the phase offset calculated by the microprocessor 136 is supplied to a digital-to-analog converter 137 in the form of a data word that the latter converts into the analog control signal BAS for setting the bias current according to a relationship $$W(n) = W_o + Z(n). \qquad (3)$$

where W (n) denotes the momentary amplitude of the control signal BAS, $W_o$ references a nominal DC voltage value and Z (n) references the current binary value taken from the microprocessor 136.

In order to illustrate possible realizations for the concept on which the method of the present invention is based, respective exemplary embodiments in analog and, respectively, digital circuit technology were set forth above. It is clear that the described embodiments merely represent selected examples of implementations that could also be realized in some other form. It is therefore, in fact, immediately clear that, for example, a mixed analog/digital implementation would also be possible in a form such that an analog phase measuring device as set forth with reference to FIG. 2 could be combined with a digitally-designed control unit 13' of FIG. 4. In this case, the analog signal AS output by the phase measuring device 12 would merely have to be converted into a binary value with the assistance of an analog-to-digital converter, this binary value then being supplied to the microprocessor. However, it would then be advantageous to compare this binary value supplied to the microprocessor to a given threshold before an integration. The supplied binary value is therefore only considered in the integration when it represents a prescribed, minimum phase difference.

The phase measuring device 12' set forth with reference to FIG. 4 uses an intermediate storage register 127 as an output stage that supplies the microprocessor 136 with a complete binary word. In a modification of this implementation, however, it would also be conceivable to continuously execute a comparison of the counter reading to the content of the reference register upon employment of a binary counter 123 and of the reference register 124, as will as of a digital comparator 125. This digital comparator 125 could be constructed such that it always continuously outputs brief-duration pulses in the clock of the high-frequency internal clock pulse sequence CLK1 when the counter reading of the binary counter 123 exceeds the content of the reference register 124. These output signals of the digital comparator could also be directly supplied to the microprocessor 136. In this case, however, the microprocessor would then have to add up these pulses for the duration of a bit cell, in order to thus itself generate a binary value corresponding to the momentary pulse width of the weighted phase pulse PHS before the described integration and amplification can be carried out.

It was also set forth in detail with respect to the described exemplary embodiments that the control signal for the adaptation of the bias current is downwardly limited. It would also be conceivable without further ado and would also be meaningful to likewise introduce an upper threshold. But the peak shift would usually not exceed an upper mean value as long as the recording signal system, including the magnetic tape, operates reliably.

However, the case would also be conceivable wherein the control signal or, respectively, the peak shift nonetheless exceeds an upper threshold; then, however, a fault must be present, for example, the magnetic tape material employed must have unreliable material properties. In such a case, a fault signal could also be derived from the control signal.

Finally, it should be pointed out again that it is not, for example, only the bias current that must be variable. Within the framework of the overall concept, it would definitely be conceivable, given a permanently-prescribed relationship between the data recording current and the bias current, to adapt the resultant recording current dependent on the control signal.

These examples show that a multitude of embodiments are conceivable within the scope of the present invention and make it clear that the invention itself is definitely not limited to the described embodiments.

As just indicated, although the present invention has been described by a reference to a particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for recording data information on a moving magnetic tape, comprising:
   a magnetic write head disposed adjacent the magnetic tape;
   a recording circuit connected to said write head and responsive to binary data signals and a bias control signal to cause said write head to magnetically inscribe the information of the binary data signals onto the magnetic tape;
   a magnetic read head disposed adjacent the magnetic tape and spaced from said magnetic write head for reading the information of the recorded binary data signals and producing corresponding read signals;
   read circuit means connected to said magnetic read head for amplifying and editing the read signals to reproduce the binary data signals;
   phase comparison means connected to said read circuit means for comparing the edited read signals and a clock as comparison signals and generating phase pulses whose pulse width corresponds to the phase difference between the comparison signals;
   measuring means connected to said phase comparison means for measuring the pulse width of the phase pulses and generating an output signal having an amplitude corresponding to the measured phase difference; and
   bias control means connected to said recording circuit and to said measuring means for converting said output signal thereof into a bias control signal for said recording circuit.

2. The circuit arrangement of claim 1, wherein said bias control means comprises:
   a variable reference voltage source for providing a variable reference voltage corresponding to a prescribed minimum phase difference, a summing element connected to said measuring means and said voltage source for forming the difference between the measured phase difference and the reference voltage, and an analog integrator connected between said summing element and said recording circuit for integrating the difference to form the bias control signal.

3. The circuit arrangement of claim 1, wherein said measuring means comprises:
   binary counter means connected to said phase comparison means as a pulse width detector, a register for storing a reference value for a prescribed minimum pulse difference, a digital comparator connected to said register and to said binary counter means for comparing the binary count with the reference value, an output, and switching means connected between said digital comparator and said output for providing an output signal in response to the binary count exceeding the reference value.

4. The circuit arrangement of claim 3, wherein said switching means comprises:
an intermediate register connected to said binary counter means for storing the binary count representing the respective phase difference.

5. The circuit arrangement of claim 4, wherein said bias control means comprises:
a microprocessor connected to said measuring means for calculating a digital value corresponding to the bias control signal and a digital-to-analog converter connected between said microprocessor and said recording circuit for converting the output of said microprocessor into an analog bias control signal.

6. The circuit arrangement of claim 1, wherein:
said measuring means comprises an analog pulse width detector.

7. The circuit arrangement of claim 6, wherein said analog pulse width detector comprises:
an integrator for forming a means value of the peak shift from the phase pulses.

8. The circuit arrangement of claim 6, wherein said analog pulse width detector comprises:
a signal input connected to said phase comparison means;
an input network connected to said phase comparison means via said signal input to receive the phase pulses, including a series resonant circuit connected between said signal input and ground and including a tap; and
an integrator output network comprising a transistor emitterfollower stage connected to said tap and including an emitter and an output connected to said emitter and a parallel resonant circuit connected between said emitter and ground for forming the integrated output signal.

9. The circuit arrangement of claim 8, wherein:
said input network comprises a transistor including an emitter connected to said signal input, a collector and a base connected to said collector; and
said series resonant circuit comprises a resistor connected between said emitter and said collector, and a capacitor connected between said collector and ground.

10. The circuit arrangement of claim 8, wherein:
said integrator output network comprises a transistor in said transistor emitter-follower stage including a base connected to said input network, a collector connector to an operating voltage source, a first resistor connected between said collector and said base, a second resistor connected between said emitter and ground and a capacitor connected in parallel with said second resistor.

11. A method for recording data information on a magnetic recording medium with the assistance of a magnetic write head and a controllable recording amplifier connected to drive the magnetic write head and to which the data information are applied in the form of binary data signals and on which bias signals are superposed, the binary data being read by a read head connected to a read electronics device, comprising the steps of:
recording the data signals;
reading the recorded data signals immediately after recording;
measuring the peak shift of the read data signals; and
continuously correcting the amplitude of one of either the binary data signals or the bias signals dependent on the measured peak shift by feeding back a signal from the read electronics device in order to achieve an optimum peak shift.

12. The method of claim 11, and further comprising the steps of:
comparing the measured peak shift to a prescribed reference value; and
initiating the step of correcting only when the measured peak shift exceeds the prescribed reference value.

13. A method for recording data information on a magnetic recording medium with the assistance of a magnetic write head and a controllable recording amplifier connected to drive the magnetic write head and to which the data information are applied in the form of binary data signals and on which bias signals are superposed, comprising the steps of:
recording the data signals;
reading the recorded data signals immediately after recording;
measuring the peak shift of the read data signals; and
correcting the amplitudes of one of either the bindary data signals or the bias signals dependent on the measured peak shift in order to achieve an optimum relationship between the read output signal amplitude and minimum peak shift;
averaging the measured values of the peak shift over a prescribed time interval to obtain a mean value; and applying the mean value as a momentary actual value to a control circuit for effecting the step of correcting.

* * * * *